Figure 1:
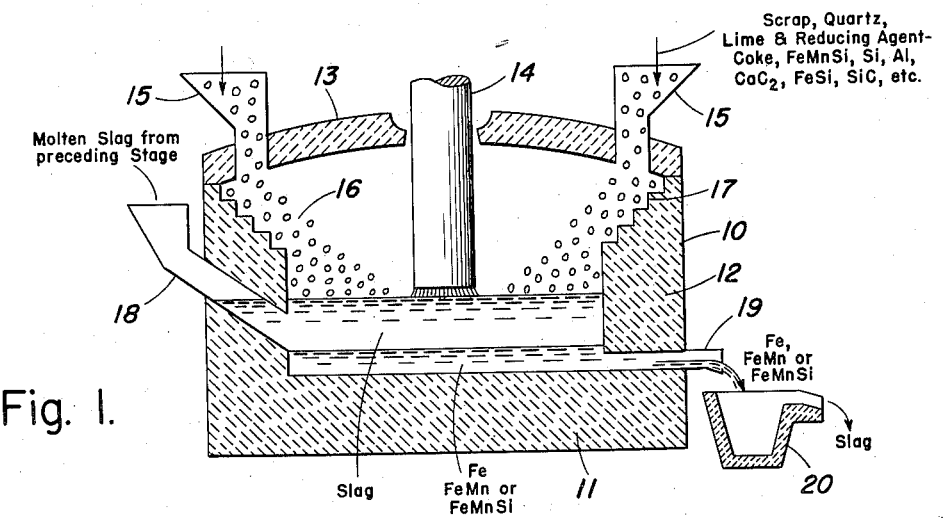

April 15, 1958     M. J. UDY     2,830,890
PROCESS FOR THE PRODUCTION OF FERROMANGANESE
FROM LOW-GRADE MANGANESE-BEARING MATERIALS
Filed July 22, 1955

INVENTOR
Marvin J. Udy

United States Patent Office 2,830,890
Patented Apr. 15, 1958

2,830,890

PROCESS FOR THE PRODUCTION OF FERRO-MANGANESE FROM LOW-GRADE MANGANESE-BEARING MATERIALS

Marvin J. Udy, Niagara Falls, N. Y., assignor to Strategic-Udy Metallurgical & Chemical Processes Limited, Hamilton, Ontario, Canada, a corporation of Ontario Application July 22, 1955, Serial No. 523,697

12 Claims. (Cl. 75—11)

The present invention relates to metallurgy and has for an object the provision of an improved metallurgical process. More particularly, the invention contemplates the provision of an improved metallurgical process which can be employed advantageously and economically to produce high-grade metallic manganese products from manganese-bearing materials of too low-grade to be treated commercially by means of heretofore customary methods or processes. The principal object of the invention is the provision of an improved process for the production of ferromanganese silicon and ferromanganese products of high, medium, or low carbon content, from relatively low-grade manganese-bearing materials containing manganese in oxide form.

This application is a continuation-in-part of my copending United States application, Serial No. 341,415, filed March 10, 1953, and entitled "Manganese Recovery," which was issued as U. S. Patent No. 2,775,518 on December 25, 1956.

According to some heretofore customary practices employed in the smelting of manganese oxide-bearing materials with solid carbon, substantial quantities of basic fluxing materials such as lime and dolomite are employed for fluxing acid components of the charge, such as silica. This type of practice results in the production of large quantities or volumes of high-melting point slags which, in turn, necessitate operating at relatively high temperatures in order to produce fluid or workable slags. The use of high temperatures results in high volatilization losses of manganese, and, in addition, the production of large quantities or volumes of slag contributes further to loss of manganese values by providing large volumes of solvent or vehicle for manganese compounds from which it is impossible to recover manganese on any economical basis.

Furthermore, in prior processes of the general class described, the conventional practice is to effect reduction of the manganese ore in a submerged arc type of electric furnace to which charge material is fed such as to build up and maintain a substantially deep bed or column of raw charge material surrounding the furnace electrodes. In this type of operation, it is not possible to obtain more than approximately eighty percent (80%) of manganese values contained in the original charge material, even when treating high-grade manganese oxide ores, except possibly by resorting to multistage techniques wherein the manganese-bearing slag product recovered from an initial reduction operation is treated in a subsequent stage or stages for further recovery of manganese or manganese-bearing products in the manner described in my aforementioned patent. Under existing operating techniques, attempts at increasing the percentage recovery of manganese usually result in overdriving the furnace with subsequent loss of manganese through volatilization, and operating costs are such that it is not economically feasible to even attempt recoveries from ores of the type which may be treated successfully and cheaply in accordance with a preferred process of the present invention.

The process of the invention is essentially a two-stage process in the first stage of which I treat natural or altered charge material of relatively low manganese (oxide) content and iron in the ratio of less than 4 Mn to 1 Fe, or high manganese iron ores, by smelting in a covered electric furnace under accurate conditions of temperature control, a pre-treated, substantially constant composition manganese oxide-containing charge with a controlled amount of carbonaceous reducing material, and controlled amounts of added acidic or basic fluxing material, to effect reduction to the metallic state of iron of the charge in excess of that desired in the ferromanganese or ferromanganese silicon product sought to be produced, without reducing to the metallic state any substantial amount of the manganese of the original charge, and with the production or molten metallic iron containing any impurities present in the original charge such as phosphorus, arsenic, lead, copper, sulphur, etc., and molten manganese silicate-bearing slag containing the manganese of the charge in oxide form, and having a base to acid ratio (including manganous oxide as a base), in the approximate proportion 1 base to 1 acid, or anywhere within the range 0.8 to 1.5 base to 1 acid. For optimum results, however, I prefer to operate the first furnace to produce slag having a base-acid ratio of 1.2 to 1. I separate the metallic iron from the manganese silicate-bearing slag produced in the first stage and charge the slag in the molten state to a second furnace in which it is smelted in a combined arc resistance-slag resistance type of furnace, again under accurate conditions of temperature control, and in the presence of a controlled amount of a carbonaceous reducing agent or a non-carbonaceous reducing agent, and controlled amounts of added acidic or basic fluxing material to produce, (1) a ferromanganese-silicon product of controlled silicon content (18–45%) and controlled carbon content (1.5–0.06%), containing manganese of the original charge in amounts representing ninety to ninety-five percent (90–95%) recoveries and higher, and a waste slag product, or, (2) I may treat the molten manganese silicate-bearing slag recovered from the first stage by smelting in the second stage in the presence of a controlled amount of carbonaceous reducing material and controlled amounts of added basic fluxing material to produce a standard grade high-carbon (5–7%) ferromanganese (80% Mn) product containing manganese of the original charge in amounts representing ninety to ninety-five percent (90–95%) recoveries and higher, and a waste slag product having a base to acid ratio in the approximate proportion 2 base to 1 acid, in a manner similar to the single stage process for treating high-grade manganese oxide-bearing materials as described in my co-pending application Serial No. 523,696, filed of even date herewith, and entitled "Process for the Production of Ferromanganese From High-Grade Manganese-Bearing Materials." In accordance with a preferred process of the present invention, ferromanganese silicon, recovered from a second stage smelting operation, is charged to a third furnace of the arc resistance-slag resistance type and smelted with manganese silicate-bearing slag, recovered from a first stage smelting operation, under carefully controlled conditions to produce medium-carbon or low-carbon ferromanganese. The ferromanganese silicon produced in the second stage may be controlled with respect to silicon-carbon content to provide a product ideally suited for the production of medium-carbon ferromanganese in the third furnace, i. e., a ferromanganese silicon product of approximately eighteen percent (18%) silicon and approximately one and one-half percent (1.5%) carbon, or, it may be adjusted to provide a product of silicon-carbon content ideally suited for the production of low-carbon ferromanganese in the third stage, i. e., a ferromanganese silicon product of approximately forty to forty-five percent (40–45%) silicon and approximately six-hundredths of one percent (0.06%) carbon.

The invention is based in part on my discovery that substantial advantages with respect to manganese recovery may be obtained by avoiding the addition of substantial amounts of basic fluxing material to a charge of manganese oxide-bearing material which is to be smelted in the presence of a solid carbonaceous reducing agent such as coal or coke. In accordance with one feature of my invention, a low-grade manganese oxide-bearing ore, concentrate, or the like, or a high manganese iron ore, in which the manganese is present in the form of one or more higher oxides than manganese oxide (MnO), as, for example, in the form of manganese dioxide ($MnO_2$) or hausmannite ($Mn_3O_4$) or both, is smelted in an initial smelting stage with solid carbonaceous reducing material under such conditions of control as to utilize as a basic fluxing agent, manganous oxide (MnO) of the ore or concentrate, rather than any substantial amount of added basic fluxing agent such as lime or dolomite in any form. In particular, I have found that by utilizing the basic properties of manganous oxide (MnO) in smelting manganese oxide-bearing ores of the general type described, with solid carbonaceous reducing agent I can remove iron and impurities and concentrate the manganese values for treatment in a subsequent stage or stages in the production of valuable manganese-bearing products. The smelting temperature required is sufficiently low to produce fluid or workable slags and to substantially completely avoid volatilization losses of manganese. Furthermore, the volume of slag produced is lowered to such a degree that recoveries of manganese in a subsequent stage or stages are of the order of ninety to ninety-five percent (90–95%) and higher. The slags from the initial smelting operation may contain as much as twenty to fifty percent (20–50%) of manganese depending on the particular ore used.

In the submerged arc type of smelting technique employed heretofore in industry, the positioning of charge material surrounding the furnace electrodes as described hereinbefore, causes an undesirable concentration of coke adjacent the electrodes which makes its virtually impossible to control operating temperatures within the furnace to any accurate degree, and very often results in over-reduction of the charge with increased volatilization losses. In accordance with a further feature of the present invention, I avoid this phenomenon completely and am able to obtain a very accurate temperature control in all stages of the process through careful positioning of the furnace electrodes in a manner similar to that described in my aforementioned patent. Specifically, in accordance with a preferred process of the invention for the production of high carbon ferromanganese, ferromanganese silicon and ferromanganese products, per se, from low-grade manganese oxide-bearing materials, I prefer to employ a covered electric furnace with one or more vertically extending electrodes mounted in conventional fashion. In operating such a furnace in the various stages of the process of the present invention, I avoid wetting of the electrodes with molten slag and thereby avoid full slag resistance heating by maintaining their arcing tips a distance ranging from about one-half inch (½") above the surface of molten slag in the furnace to about three inches (3") below the surface of the molten slag. By operating the furnace in this manner, the heat generated in the slag by the $I^2R$ effects due to the resistance of the slag will reach a substantially constant temperature equivalent to the melting point of the slag and no higher while there is unmelted charge within the furnace. On the other hand, the heat generated in the short arcs (½" above to 3" within slag) and due to the $I^2R$ effects of the arcs, per se, is of a higher order of temperature, and, thus, by controlling the applied voltage to the slag bath as well as the rate of feed of charge material (lbs. per KWH) to the furnace, I am able to control the combined slag resistance and arc resistance heating to temperatures within 100° C. of the melting point of the alloy produced. Furthermore, I avoid penetration of the electrodes within a descending column of raw charge by introducing charge material into the interior of the arc resistance-slag resistance furnace and onto the surface of a molten slag bath maintained therein at a rate such that it is deposited on the surface of the molten slag bath between the furnace walls and the electrodes, or at a rate and direction of flow such that it does not flow into contact with the electrodes and does not build up on the surface of the slag around the electrodes.

In carrying out a process of the invention, a further important feature thereof resides in the preliminary treatment of manganese oxide ore for purposes of providing a reduction charge to the first stage of substantially constant composition. Thus, I have found that it is essential for proper carbon control and subsequent selective reduction in the smelting stages of the process that the manganese-bearing material be stabilized to a substantially constant composition by removal of all water, the labile oxygen from $MnO_2$, $CO_2$, $H_2O$, etc. For this purpose, I heat the raw manganese oxide-bearing ore in a rotary kiln or other suitable piece of equipment, prior to the initial reduction step, to a temperature within the range 900° C. to 1200° C. in order to stabilize it to a constant composition with respect to oxygen content and thereby obtain better control of reduction by carbon of the coke, coal, etc. In treating high manganese iron ores, I may add coke to the charge heated in the kiln and sinter the charge to effect at least partial reduction of iron oxide present in the ore.

Figure 2:
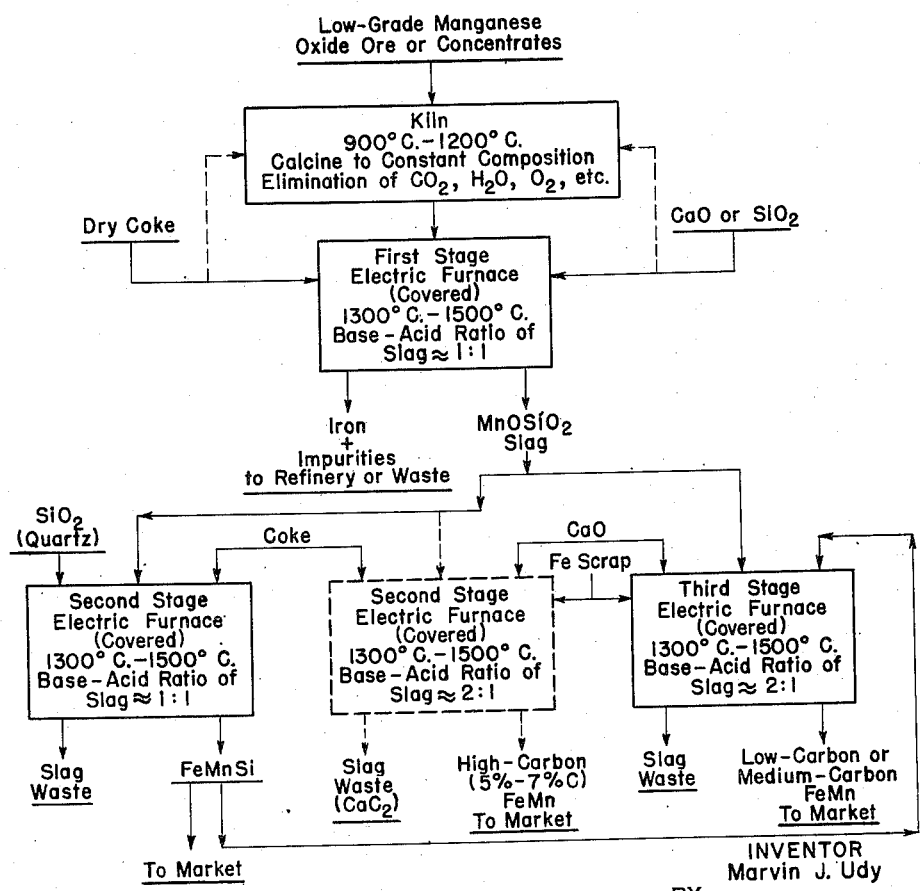

The aforementioned as well as other features and objects of the invention may be best understood by reference to the following description of specific embodiments thereof taken in conjunction with the accompanying drawing wherein:

Fig. 1 is a sectional elevation view of a covered arc electric furnace of the type employed in the smelting stages of the process of my invention; and Fig. 2 is a schematic flow diagram or flow sheet illustrating the exact sequence of steps involved in a preferred process of the present invention.

In carrying out a process of the invention for smelting a charge comprising manganese oxide-bearing ore or concentrates involving utilization of manganous oxide (MnO) as a basic fluxing material, the smelting charge employed in the first stage may consist essentially of the calcined manganese oxide-bearing material, a relatively small amount of added fluxing material, if required, and a controlled amount of a solid carbonaceous reducing material, such as coal or coke. The components of the charge are so proportioned as to provide carbonaceous reducing agent in amount sufficient for selective reduction to the metallic state of iron of iron oxide present in the charge in excess of that desired in the high carbon ferromanganese, ferromanganese silicon or ferromanganese product sought to be produced, and to reduce manganese of the higher oxides of manganese remaining after calcining to the manganous oxide (MnO) state without appreciable reduction of manganese to the elemental or metallic state, or vaporization of manganese; provision being made for retention of the major portion of the manganese in the oxide form in the molten manganese-silicate slag product produced in the first stage, and in an amount sufficient to form with the other basic components of the ore such as calcium oxide (CaO), magnesium oxide (MgO), barium oxide (BaO), etc., and with silica ($SiO_2$) present in the ore, slag having a molecular base to acid ratio of about 1.0 molecule of base to 1.0 molecule of acid (silica) or anywhere within the range 0.8 to 1.5 base to 1 acid, but, preferably, 1.2 base to 1 acid. Thus, in calculating a charge for the initial smelting stage on the basis of a low-grade ore or concentrate which has been stabilized by calcining the raw ore or concentrate in the manner explained above, I calculate all basic constituents, including manganese oxide and other basic oxides such as calcium oxide, magnesium oxide, barium oxide, etc., to the equivalency of calcium oxide, and adjust the equivalent calcium oxide to silica to provide a slag of approximately 1 base to 1 acid, i. e., $MnO+MgO+BaO+CaO$, etc. to $SiO_2$ should be in the ratio of about 1:1; calcium oxide or an equivalent basic fluxing agent, or silica or an equivalent acid fluxing agent, being added only as required to adjust the base-acid ratio to the desired balance. Alumina ($Al_2O_3$) when present in the ore or concentrates in amounts less than ten percent (10%) to twelve percent (12%) may be disregarded in the calculations. Larger amounts of alumina are calculated to $SiO_2$ equivalency. It is of the utmost importance for efficient selective reduction in the initial smelting stage that the carbon determination be made on the basis of a substantially constant composition charge, and, accordingly, that feature of my invention involving stabilization of the charge material by calcining prior to reduction, contributes substantially to the overall efficiency of my process. When the ore or concentrate contains impurities such as phosphorus, arsenic, lead, copper, nickel, sulphur or cobalt, the molten metallic iron produced in the first stage functions as a collector for these elements and they are removed with and may be found in the metallic iron product recovered, which may be treated in a refining furnace for the recovery of metallic iron or discarded as dictated by the economics of a particular operation. The process provides for the effective removal of impurities such as phosphorus, for example, when present in the ore in amounts upwards of three percent (3%). Additional iron in the form of iron ore may be added to the charge for the removal of more phosphorus.

In smelting a charge for the removal of iron and impurities in the first stage of a process of my invention, preferably, I employ a covered furnace provided with one or more vertically extending electrodes, and I operate the furnace at such voltages as to maintain the arcing tips of the one or more electrodes in position with respect to molten slag contained in the furnace within about one-half inch (½") above the surface of the molten slag bath to about three inches (3") below the surface of the slag bath, thereby avoiding wetting of the electrodes by deep immersion within slag. Furthermore, I introduce charge material into the furnace and onto the surface of the molten slag bath therein in such manner as to avoid any substantial build-up of charge material around the electrodes. Under such conditions of operation large amounts of power can be put into the slag under very accurate conditions of temperature control within the slag, and uniform reduction of iron is effected without the development of local intense temperature zones. Thus, I am able to maintain a very accurate temperature control within the furnace by suitably adjusting the rate of feed of charge material and the temperature of the slag bath obtained through conjoint use of arc resistance heating and slag resistance heating. The temperature of the slag within the furnace may be held to within 100° C. of the melting point of the alloy produced. With the slags utilized in accordance with the invention, I may operate at temperatures within the range 1300° C. to 1500° C., thereby substantially avoiding vaporization of manganese as characteristically occurs in conventional submerged arc types of smelting operations by reason of the high temperatures required to produce fluid or workable slags and further resulting from accumulations of coke, etc. Furthermore, by regulating the electrodes in this manner, I am able to insure delivery to the molten slag bath of substantially all of the arc-developed heat and can inhibit any substantial dissipation of heat due to reflection. I also effectively avoid the establishment of high-pressure zones around the electrodes caused by carbon monoxide gases generated during the reduction process becoming entrapped by deep beds of raw charge material, as occurs in conventional submerged arc operations, and the attendant danger to operators resulting from periodic so-called "blowing" due to action of gases entrapped in this manner. The exact method of operating a furnace in accordance with my invention is explained more fully hereinafter in connection with a description of Fig. 1 of the drawing.

Between the first and second smelting stages of the process of my invention, I prefer to employ a holding furnace in order to effect complete separation of metal and molten slag. The holding furnace may be of any suitable type and is operated such that power to compensate for radiation losses is all that is consumed in running the furnace. This procedure is particularly important when high manganese iron ores are being treated and iron must be removed.

In the second stage of a preferred process of the invention, the manganese-silicate slag produced in the initial smelting operation is charged, either in molten form directly from the first furnace or from the holding furnace, or, after cooling, to a second furnace of the covered type operated in accordance with the same technique explained hereinbefore in connection with the initial smelting operation. The slag is introduced into the second furnace and onto the surface of a molten slag bath maintained therein, and the furnace is operated with the electrodes carried to a position from one-half inch (½") above to three inches (3") within the layer of molten slag to procure accurate temperature control (1300–1500° C.) and to minimize losses through volatilization.

I may operate the second furnace to produce (1) a ferromanganese silicon product for recovery as such, or, preferably, for use in conjunction with additional quantities of manganese-silicate slag from the first stage in the production of standard grade low-carbon or medium-carbon ferromanganese products in a subsequent stage, or (2) I may treat the manganese silicate slag for direct production within the second furnace of a standard grade high-carbon ferromanganese product by reduction of iron oxide of the slag and reduction of manganese contained in manganese oxide displaced from chemical combination with silica in the manganese silicate slag by means of added fluxing material and carbonaceous reducing material.

In operating the second furnace for the production of ferromanganese silicon in accordance with a process of my invention, carbonaceous reducing material in the form of coal or coke, and silica to provide sufficient silicon for the alloy to be produced and preferably in the form of high-grade quartz, are added to the manganese-silicate slag in forming a charge for the furnace. Carbonaceous reducing material is employed in an amount sufficient to, (1) provide for the reduction to the metallic state of iron oxide and manganese oxide contained in manganese oxide, (2) provide for the reduction of silica in an amount equivalent to that desired in the final ferromanganese silicon product, and (3) provide carbon for chemical combination with the ferromanganese silicon produced, to the extent desired in the final product. The resulting slag is adjusted to provide a base-acid ratio of 1.0 to 1.5 base to 1.0 acid. By suitably adjusting the charge components I may recover ferromanganese silicon products for use in the production of either medium-carbon ferromanganese or low-carbon ferromanganese in a third furnace in the presence of additional quantities of manganese-silicate slag, as will appear more fully from a consideration of the specific examples of my process set forth hereinafter.

In utilizing a ferromanganese silicon product produced in the second stage as a non-carbonaceous reducing agent in the production of medium-carbon ferromanganese or low-carbon ferromanganese, I employ a third furnace operated in exactly the same manner as the furnace in the first and second stage smelting operations, and supply to the surface of a molten slag bath maintained therein, a charge consisting of manganese silicate slag from the first stage or from a holding furnace, ferromanganese silicon from a second stage smelting operation, added basic fluxing material such as calcium oxide, and scrap iron or equivalent iron oxide, as required, to provide for the production of a standard grade ferromanganese product. The components of the charge are so proportioned as to provide reducing agent in an amount sufficient to reduce to the metallic state iron of iron oxide present in the slag from the first stage or added to the charge, and to reduce to elemental manganese manganese oxide displaced from chemical combination with silica in the manganese-silicate slag. Thus, in calculating a charge for the third furnace, I calculate all basic constituents other than manganese oxide, such as calcium oxide, magnesium oxide, etc., to the equivalency of calcium oxide, and adjust the equivalent calcium oxide to the silica in the charge to provide for the production of a slag of approximately 2 base to 1 acid (or anywhere within the range 1.7 to 2.2 molecules of base to 1.0 molecule of acid), i. e., $MgO+BaO+CaO$, etc. to $SiO_2$ should be in the ratio of about 2:1; calcium oxide or an equivalent basic fluxing agent being added only as required to adjust the base-acid ratio to the desired range. When employing a non-carbonaceous reducing agent in this manner, it is desirable to provide basic slag forming material in an amount equivalent to that required for combining with any acid component formed as the result of the reduction of manganese and iron in the molten slag.

Of course, I may produce medium-carbon ferromanganese or low-carbon ferromanganese directly in the second stage from manganese-silicate slags obtained in the first stage by employing non-carbonaceous reducing material from an external source. For example, the reduction in the second stage smelting operation may be conducted with silicon metal or aluminum for the production of low-carbon ferromanganese. For reasons of economy, however, and inasmuch as the process of my invention is designed for use in connection with low-grade ores not heretofore usable in any known process, I prefer to operate substantially exclusively, wherever possible, with raw materials obtained from the process of the invention.

When manganese-silicate slags produced in the first stage are treated in the second stage for the direct production of a high-carbon (5–7%) ferromanganese (80% Mn) product, I operate the furnace in the second stage in exactly the same manner as in the other stages of the process described hereinbefore. The molten slag from the first stage or from the holding furnace is charged to the second-stage furnace and onto the surface of a molten slag bath maintained therein. In calculating a charge for the second stage production of high-carbon ferromanganese, I calculate all basic constituents other than manganese oxide, such as calcium oxide, magnesium oxide, barium oxide, etc., to the equivalency of calcium oxide and adjust the equivalent calcium oxide to the silica in the charge to provide for the production of a slag of approximately 2 base to 1 acid; adding calcium oxide or an equivalent basic fluxing agent to adjust the base-acid ratio to the desired range. It is essential that the coal, coke, etc., used as a reducing agent be dry, and, that carbon be provided in an amount sufficient for reduction of manganese of manganese oxide displaced from silica in the manganese-silicate slag, reduction of iron of iron oxide present in the slag from the first stage or added to the charge for purposes of adjusting the iron content to standard grade ferromanganese, chemical combination with metallic iron and manganese for the production of high-carbon ferromanganese, and to form in the basic slag (2 CaO to 1 $SiO_2$) a small amount or trace of calcium carbide ($CaC_2$). It is the formation of calcium carbide which permits the production of slags very low in manganese, in that, a slight amount of calcium carbide in the slag upsets the equilibrium of the manganese oxide and slag and permits almost complete reduction of manganese. In this manner, slags containing one percent (1%) or less of manganese can be produced readily as compared with ten percent (10%) to twenty percent (20%) present in slags formed in accordance with conventional smelting techniques. Alternatively, instead of forming the calcium carbide in the slag from the lime and coke additions, I may add calcium carbide to the charge directly in varying quantities either in the form of a high-grade product (4.75 cu. ft. $C_2H_2$ per pound) or a low-grade product (2.5 to 3.5 cu. ft. $C_2H_2$ per pound). The calcium carbide may be used in whole or in part with coke or in place of coke as the reducing agent. It functions to supply lime for the silica and acts as a reducing agent for manganese and iron when used in larger amounts than the trace necessary for the production of very low manganese slags. I may also employ a non-carbonaceous reducing agent such as ferrosilicon, silicon carbide or aluminum to reduce last traces of manganese from manganese slags or to "clean" the slags, so to speak, with the production of waste slags very low in manganese, in lieu of calcium carbide in the manner explained above, provided lime is added, as required, to maintain the desired ratio of 2.0 base to 1.0 acid within the slag. The charge is smelted in the second furnace at a temperature controlled within the range 1300–1500° C. in the manner previously explained in connection with the initial and subsequent smelting stages, with the production of a high-carbon ferromanganese product and a waste slag product.

In order to initiate operation of a furnace within any stage of my process, I may deliberately add extra slag of approximately a 1:1 or 2:1 ratio of CaO to $SiO_2$ depending on the desired slag composition for the particular stage, to establish a shallow layer of molten slag within the furnace. After slag has accumulated in a furnace, it is removed as required, but I always leave sufficient slag in the furnace so that the electrode tips can be carried on the slag or to the depth desired, as specified hereinbefore. I have found that operation with the electrodes carried to a position of one-half inch (½") above to a maximum of three inches (3") within the shallow layer of molten slag produces optimum results under actual operating conditions. Operation of the furnaces in this manner permits the conjoint use of arc resistance and slag resistance heating within the smelting furnaces. Through operation of the furnace constantly as an arc resistance-slag resistance furnace with short arcs, and, by reason of the substantially constant resistance slag bath obtained through control of the depth of slag within a furnace, I am able to operate constantly at a power factor of 95% as compared with power factors of 75% to 85% at which large arc electric furnaces are operated in accordance with heretofore customary practices.

In the operation of the electric furnace according to my invention, automatic electrode regulators are set to maintain the electrodes in constant or substantially fixed positions relative to the surface of the molten slag bath, because, for a particular type of operation, the slag is of substantially constant composition and, therefore, of substantially constant resistance. When an increase or decrease in the temperature of the molten slag is desired for a particular operation, the voltage and power input is simply increased or decreased and the electrode regulator is adjusted to maintain the arc lengths within the desired range specified hereinbefore. In following this procedure, the resistance is maintained constant and, consequently, the power input is increased or decreased.

It should be apparent that by increasing or decreasing the arc gaps within the limits specified hereinbefore, I am able to control both arc resistance heat supplied to the charge and slag resistance heat developed within the charge, and the conjoint use of heat supplied from both sources enables me to effect a very accurate temperature control of the overall slag bath. Furthermore, the temperature control effected in this manner is not subject to frequent unbalance because of local intense temperature zones caused by coke accumulations, etc., since I avoid the build-up of charge material around the electrodes and thereby effectively avoid conditions which lead to the establishment of such zones of uncontrollable heat.

The exact method of operating a furnace within the various stages of my process may be best understood by reference to Fig. 1 of the drawing wherein I have shown such a furnace 10, which may be of any suitable configuration in horizontal cross-section. The furnace 10 comprises a hearth or bottom portion 11, side walls 12, and a roof 13 all formed of appropriate refractory materials.

The furnace roof 13 is provided with suitable openings through which electrodes 14 (one shown) extend and which permit vertical movement of the electrodes in accordance with operational demands and characteristics. The space between the electrodes and the edge of the openings through which they extend or project may be provided with any suitable packing or sealing means to inhibit or restrict the flow of gases between the interior of the furnace without interfering with the necessary vertical movement of the electrodes.

Hoppers 15 having their lower portions extending through and sealed in openings in the roof 13 are provided adjacent the outer side edges of the arc electric furnace 10 in alinement with the electrodes to permit introduction of charge material 16 into the interior of the furnace. Those portions of the side walls of the furnace immediately beneath hoppers 15, as indicated by reference numeral 17 in Fig. 1, preferably are so designed as to provide a slope corresponding to or equivalent to the angle of repose of the charge material. Preferably, the sloped portions of the walls are stepped, as shown in Fig. 1, to provide for the deposition and retention thereon of protective coatings of charge material.

When a carbonaceous reducing agent is included within the charge to a furnace in any stage, a conduit (not shown) is provided for communicating with the interior of the furnace 10 through an opening in the roof to permit the collection and utilization of carbon monoxide produced during the course of the reduction. A charging spout or runner or launder 18 is provided to permit the introduction into the interior of furnace 10 of slag from a preceding stage. The slag introduced may be in the molten state or in the solidified and granular or finely-divided state. If desired, solid granular or finely-divided slag to be treated may be introduced into the interior of the furnace 10 as a component of the charge introduced through the hoppers 15. The calcined ore or concentrates charged to the initial stage may be introduced into the interior of the furnace 10 as a component of the charge material supplied through hoppers 15 or through launder 18 as a hot product directly from the kiln. The furnace 10 is further provided with a conventional taphole 19 through which molten ferromanganese silicon or molten ferromanganese products and molten slag may be delivered from the interior of the furnace to a suitable ladle 20 at appropriate times.

It is to be understood, of course, that other conventional types of furnaces may be substituted for the furnace 10 in any stage of my process, but not without considerable sacrifice in the overall efficiency of the process as described hereinbefore.

The following are analyses of typical ores used in the production of ferromanganese products in accordance with a process of the invention:

(I) LOW MANGANESE—LOW IRON ORE

| | Percent |
|---|---|
| Manganese (Mn) | 7.88 |
| Calculated to MnO | 10.20 |
| Iron (Fe) | 12.04 |
| Calcium oxide (CaO) | 1.42 |
| Magnesium oxide (MgO) | 7.28 |
| Silica ($SiO_2$) | 42.80 |
| Alumina ($Al_2O_3$) | 12.50 |
| Sulphur (S) | 0.036 |
| Phosphorus (P) | 0.33 |
| Carbon dioxide ($CO_2$) | 4.30 |

(II) LOW MANGANESE—LOW IRON ORE

| | Percent |
|---|---|
| Manganese (Mn) | 11.40 |
| Calculated to MnO | 14.62 |
| Iron (Fe) | 11.74 |
| Calcium oxide (CaO) | 2.04 |
| Magnesium oxide (MgO) | 6.98 |
| Silica ($SiO_2$) | 32.58 |
| Alumina ($Al_2O_3$) | 12.00 |
| Sulphur (S) | 0.38 |
| Phosphorus (P) | 0.24 |
| Carbon dioxide ($CO_2$) | 12.30 |

(III) HIGH MANGANESE IRON ORE

| | Percent |
|---|---|
| Manganese (Mn) | 12.03 |
| Calculated to MnO | 14.43 |
| Iron (Fe) | 45.80 |
| Ferric oxide ($Fe_2O_3$) | 65.0 |
| Calcium oxide (CaO) | 0.19 |
| Magnesium oxide (MgO) | 0.12 |
| Silica ($SiO_2$) | 10.60 |
| Alumina ($Al_2O_3$) | 1.02 |
| Sulphur (S) | 0.008 |
| Phosphorus (P) | 0.10 |
| Loss on ignition | 6.55 |

The following examples illustrate the specific application of the foregoing principles and objects of the invention to the production of ferromanganese products:

*Example 1.—Preparation of ferromanganese silicon and medium and low-carbon ferromanganese products from ore of the analysis of (II) above*

The raw ore is first heated, preferably in a kiln at 1000° C., to drive off water and carbon dioxide and to stabilize the ore for selective reduction of iron.

*First stage (removal of iron and impurities).*—A charge consisting of 1000 pounds of ore, 119 pounds of calcium oxide and 46 pounds of coke was smelted at a temperature of 1425° C. in a furnace of the type illustrated in Fig. 1 and operated according to the principles of the invention, to produce 105 lbs. of iron, representing 90% of the iron present in the original ore and containing only 3.5% manganese, and a slag product of the following composition:

| | Percent | |
|---|---|---|
| MnO | 17.50 | =14.9 Mn |
| FeO | 1.84 | |
| CaO | 17.10 | |
| MgO | 8.58 | =12.01 CaO |
| $Al_2O_3$ | 14.76 | |
| $SiO_2$ | 40.00 | |
| | 99.78 | |

The coke used in the charge represented one hundred percent of theoretical but ninety percent or lower can be employed to adjust for the percentage iron desired in the ultimate ferromanganese product.

*Second stage (production of FeMnSi from slag).*—A charge consisting of 1000 pounds of molten slag from the first stage, 81.75 pounds of lime (some excess silica in slag), and ±49.8 pounds of coke of 80% fixed carbon, was smelted in a furnace of the type illustrated in Fig. 1 and operated according to the principles of the invention, to produce 202 lbs. of ferromanganese silicon containing approximately 141 pounds of manganese and representing approximately 95% recovery. The ferromanganese silicon analyzed as follows:

| | Percent |
|---|---|
| Si | 19 |
| C | 1.5 |
| Mn | 70.0 |
| Fe | 9.5 |

A waste slag product of the following composition was produced in the second stage:

| | Percent |
|---|---|
| MnO | 1.44 |
| CaO | 20.92 |
| MgO | 10.50 |
| $Al_2O_3$ | 18.06 |
| $SiO_2$ | 49.05 |

*Third stage (production of medium-carbon FeMn).*—A charge consisting of 4750 pounds of slag from a first stage reduction, 1000 pounds of ferromanganese silicon from a second stage reduction, 23.5 pounds of scrap iron and 2888 pounds of calcium oxide was smelted in a furnace of the type illustrated in Fig. 1 and operated according to the principles of the invention, to produce 831 pounds of ferromanganese containing approximately 675 pounds of manganese and representing approximately 95% recovery. The ferromanganese analyzed medium-carbon, standard grade as shown below:

| | Percent |
|---|---|
| Mn | 80 |
| Fe | 17.46 |
| C | 1.49 |

A waste slag product of the following composition was produced in the third stage:

| | Percent |
|---|---|
| MnO | 0.89 |
| $SiO_2$ | 31.95 |
| CaO | 51.67 |
| MgO | 5.69 |
| $Al_2O_3$ | 9.80 |

Low-carbon ferromanganese can be produced in the same manner in the third stage by simply adjusting the FeMnSi produced in the second stage to a higher silicon content (40–45% Si), and employing the FeMnSi as a reducing agent in the third stage. Alternatively, the second stage reduction may be effected to produce a high-carbon ferromanganese product, or, a high-carbon ferromanganese product can be produced in the third stage by using carbon as the reducing agent instead of FeMnSi, with a resultant slag containing a small amount of calcium carbide.

*Example II.—Production of iron, ferromanganese silicon and medium and low-carbon ferromanganese products from ore of the analysis of (III) above*

The raw high manganese iron ore is first heated, preferably in a kiln, to stabilize the ore, or, coke may be added prior to heating in the kiln to nodulize and reduce as much iron oxide as possible in the preliminary heating step. If sintering is not effected, the ore is heated for purposes of stabilizing it to a constant composition, and the coke or similar carbonaceous reducing material should be dried prior to charging to the first stage smelting operation. Since the base-acid ratio of this ore is approximately 1:1, no flux need be added to a charge in the first furnace. Slag of 1:1 CaO to $SiO_2$ may be added in sufficient volume to initiate operation of the furnace.

*First stage (removal of iron and impurities).*—A charge consisting of 1000 pounds of ore and 205 pounds of coke is smelted at a temperature within the range 1300° C. to 1500° C. in a furnace of the type illustrated in Fig. 1 and operated according to the principles of the invention, to produce 440 pounds of iron containing approximately two percent (2%) of the manganese present in the original ore, and a manganese-silicate slag low in phosphorus and sulphur and containing manganese present in the original charge in an amount equivalent to approximately ninety-three percent (93%) recovery. A holding furnace is employed between the first and second stages to effect complete separation of iron and slag, particularly in treating high iron ores of this type. The slag recovered had a composition as follows:

| | Percent | |
|---|---|---|
| MnO | 52.79 | =41.0 Mn |
| FeO | 4.34 | |
| $SiO_2$ | 38.99 | |
| CaO | 0.71 | |
| MgO | 0.33 | |
| $Al_2O_3$ | 3.75 | |
| | 100.91 | |

*Second stage (production of FeMnSi from slag).*—A charge consisting of 1000 pounds of slag from the first stage, 154.1 pounds of calcium oxide, and 234.6 pounds of coke of 80% fixed carbon, was smelted in a furnace of the type illustrated in Fig. 1 and operated according to the principles of the invention, to produce approximately 525 pounds of ferromanganese silicon containing approximately 380 lbs. of manganese and representing approximately 95% recovery. The ferromanganese silicon analyzed as follows:

| | Percent |
|---|---|
| Si | 19.50 |
| C | 1.66 |
| Mn | 72.10 |
| Fe | 6.38 |

A waste slag product of the following composition was produced in the second stage:

| | Percent | |
|---|---|---|
| MnO | 5.26 | =6.78 Mn |
| CaO | 40.56 | |
| MgO | 0.86 | |
| $Al_2O_3$ | 9.82 | |
| $SiO_2$ | 43.47 | |
| | 99.97 | |

*Third stage (production of medium-carbon FeMn).*—A charge consisting of 1863 pounds of slag from a first stage reduction, 1000 pounds of ferromanganese silicon from a second stage reduction, and 2280 pounds of calcium oxide was smelted in a furnace of the type illustrated in Fig. 1 and operated according to the principles of the invention, to produce 1500 pounds of ferromanganese containing approximately 1174 lbs. of manganese. The ferromanganese analyzed medium-carbon, standard grade, as shown below:

| | Percent |
|---|---|
| Mn | 81.65 |
| C | 0.83 |
| Fe | 17.05 |
| Si | 0.38 |

A waste slag product of the following composition was produced in the third stage:

| | Percent |
|---|---|
| MnO | 0.70 |
| $SiO_2$ | 33.07 |
| CaO | 61.43 |
| MgO | 0.019 |
| $Al_2O_3$ | 5.50 |

In Fig. 2 of the drawings, I have illustrated in schematic form the process of my invention, wherein the solid lines designate the sequence of operations for the production of ferromanganese silicon and medium-carbon or low-carbon ferromanganese and the dash lines designate a preferred process for the production of high-carbon ferromanganese in a second stage reduction operation.

Since it is considered obvious that many changes and modifications can be made in the foregoing methods and procedures without departing from the nature and spirit of my invention, it is to be understood that the invention is not to be limited to the specific details offered by way of illustration above, except as set forth in the following claims.

I claim:

1. In a process for producing a ferromanganese product from ore comprising oxides of manganese, iron, calcium, and silica, the improvement which comprises passing the ore in the form of a calcined, substantially constant composition charge into a first covered electric furnace and onto the surface of a molten slag bath maintained therein, subjecting the charge to the action of a controlled amount of a solid carbonaceous reducing agent within the furnace at a controlled temperature within the range 1300° C.–1500° C. to effect selective reduction to the metallic state of a major portion of the iron of the ore with the production of molten metallic iron and molten slag containing substantially all of the manganese of the original ore in the form of manganese silicate, separating the molten metallic iron from the molten slag, passing the molten slag into a second covered electric furnace and onto the surface of a molten slag bath maintained therein, subjecting the slag to the action of a controlled amount of a solid carbonaceous reducing agent at a controlled temperature within the range 1300° C.–1500° C. to effect reduction to the metallic state of substantially all of the manganese contained therein and the remainder of the iron of the original ore with the production of a molten ferromanganese product and molten residual slag, and separating and recovering the molten ferromanganese product from the molten residual slag, the temperatures within both furnaces being controlled within the range 1300° C.–1500° C. during the course of the process by maintaining the arcing tips of the furnace electrodes between about one-half inch (½") from the upper surfaces of the molten slag baths therein and about three inches (3") below the upper surfaces of said molten slag baths, thereby to effect combined arc resistance and slag resistance heating.

2. The process as claimed in claim 1 wherein fluxing material is added to the charge to the first furnace in an amount sufficient to produce a molten slag product comprising silica and basic oxides including manganese oxide in proportions equal to about 1.0 molecule of basic oxide to 1.0 molecule of silica, and fluxing material is added to the charge to the second furnace in an amount sufficient to produce a molten residual slag product comprising silica and basic oxides excluding manganese oxide in proportions equal to about 1.0 to 1.5 molecules of basic oxide to 1.0 molecule of silica, operation of the second furnace being conducted for the production and recovery of a molten ferromanganese silicon product.

3. In a process for producing a high-carbon ferromanganese product from ore comprising oxides of manganese, iron, calcium and silica, the improvement that comprises passing the ore in the form of a calcined, substantially constant composition charge into a first covered electric arc furnace and onto the surface of a molten slag bath maintained therein, adding fluxing material to the charge to said first furnace in an amount sufficient to produce a molten slag product comprising silica and basic oxides including manganese oxide in proportions equal to about 1.0 molecule of basic oxide to 1.0 molecule of silica, subjecting the charge to the action of a controlled amount of a solid carbonaceous reducing agent within the furnace at a controlled temperature within the range 1300–1500° C. to effect selective reduction to the metallic state of a major portion of the iron oxide of the ore with the production of molten metallic iron and molten slag containing substantially all of the manganese of the original ore in the form of manganese silicate, separating the molten metallic iron from the molten slag, passing the molten slag recovered from said first furnace into a second covered electric arc furnace and onto the surface of a molten slag bath maintained therein, adding fluxing material to the charge to the second furnace in an amount sufficient to produce a molten residual slag product comprising silica and basic oxides excluding manganese oxide in proportions equal to about 1.7 to 2.2 molecules of basic oxide to 1.0 molecule of silica, subjecting the slag within the second furnace to the action of a controlled amount of a solid carbonaceous reducing agent at a controlled temperature within the range 1300–1500° C. to effect reduction to the metallic state of substantially all of the manganese contained therein and the remainder of the iron oxide of the original ore with the production of a molten high-carbon ferromanganese product and molten residual slag, and separating and recovering the molten high-carbon ferromanganese product from the molten residual slag, the temperatures within both furnaces being controlled within the said range 1300–1500° C. during the course of the process by maintaining the arcing tips of the furnace electrodes between about one-half inch (½") from the upper surfaces of the respective molten slag baths therein and about three inches (3") below the upper surfaces of said molten slag baths, thereby to effect combined arc-resistance and slag-resistance heating.

4. The process as claimed in claim 3 wherein basic fluxing material in the form of calcium oxide and coke are added to the charge to the second furnace in an amount sufficient to form a small amount of calcium carbide in the molten residual slag.

5. The process as claimed in claim 3 wherein a small amount of calcium carbide is added to the charge to the second furnace.

6. The process as claimed in claim 1 wherein operation of the second furnace is conducted for the production and recovery of a ferromanganese silicon product of controlled silicon-carbon content, said ferromanganese silicon product being charged in a controlled amount to a third furnace and onto the surface of a molten slag bath maintained therein together with additional quantities of the molten manganese-silicate slag recovered from the first furnace, and smelted at a controlled temperature within the range 1300° C.–1500° C. with the production and recovery of a low-carbon ferromanganese product, the temperature within the third furnace being controlled within the range 1300° C.–1500° C. during the course of the process by maintaining the arcing tips of the furnace electrodes between about one-half inch (½") from the upper surface of the molten slag bath therein and about three inches (3") below the upper surface of said molten slag bath.

7. The process as claimed in claim 1 wherein operation of the second furnace is conducted for the production and recovery of a ferromanganese silicon product of controlled silicon-carbon content, said ferromanganese silicon product being charged in a controlled amount to a third furnace and onto the surface of a molten slag bath maintained therein together with additional quantities of the molten manganese-silicate slag recovered from the first furnace, and smelted at a controlled temperature within the range 1300° C.–1500° C. with the production and recovery of a medium-carbon ferromanganese product, the temperature within the third furnace being controlled within the range 1300° C.–1500° C. during the course of the process by maintaining the arcing tips of the furnace electrodes between about one-half inch (½")

from the upper surface of the molten slag bath therein and about three inches (3") below the upper surface of said molten slag bath.

8. In a process for producing a ferromanganese product from ore comprising oxides of manganese, iron, calcium, and silica, the improvement which comprises passing the ore in the form of a calcined, substantially constant composition charge into a first covered arc electric furnace and onto the surface of a molten slag bath maintained therein, subjecting the charge to the action of a controlled amount of a dry solid carbonaceous reducing agent within the furnace at a controlled temperature within the range 1300° C.–1500° C. to effect selective reduction to the metallic state of a major portion of the iron of the ore with the production of molten metallic iron and molten slag containing substantially all of the manganese of the original ore in the form of manganese silicate, separating the molten metallic iron from the molten slag, passing the molten slag into a second covered arc electric furnace and onto the surface of a molten slag bath maintained therein, subjecting the slag to the action of a controlled amount of a solid carbonaceous reducing agent in the presence of a small amount of calcium carbide at a controlled temperature within the range 1300° C.–1500° C. to effect reduction to the metallic state of substantially all of the manganese contained therein and the remainder of the iron of the original ore with the production of a molten ferromanganese product and molten residual slag, and separating and recovering the molten ferromanganese product from the molten residual slag, the temperature within both furnaces being controlled within the range 1300° C.–1500° C. during the course of the process by (1) maintaining the arcing tips of the furnace electrodes between about one-half inch (½") from the upper surfaces of the molten slag baths therein, and about three inches (3") below the upper surfaces of said molten slag baths, (2) maintaining substantially constant resistance slag baths within the furnaces by controlling the depth of molten slag, and (3) introducing charge material into the furnaces and onto the surfaces of the molten slag baths therein at a rate and in a direction of flow such as to avoid substantial submergence of the arcing tips of the electrodes within raw charge material.

9. In a process for producing ferromanganese from ore comprising oxides of manganese, iron, calcium, and silica and containing one or more impurities of the group consisting of arsenic, lead, nickel, phosphorus, sulfur, and copper, the improvement which comprises passing the ore in the form of a calcined, substantially constant composition charge into a first covered electric furnace and onto the surface of a molten slag bath maintained therein, subjecting the charge to the action of a controlled amount of a solid carbonaceous reducing agent within the furnace at a controlled temperature within the range 1300° C.–1500° C. to effect selective reduction to the metallic state of the major portion of the iron of the ore and the one or more impurities with the production of molten metallic iron containing said one or more impurities and molten slag containing substantially all of the manganese of the original ore, separating the molten metallic iron from the molten slag, passing the molten slag into a second covered electric furnace and onto the surface of a molten slag bath maintained therein, subjecting the slag to the action of a controlled amount of a solid carbonaceous reducing agent at a controlled temperature within the range 1300° C.–1500° C. to effect reduction to the metallic state of substantially all of the manganese contained therein and the remainder of the iron of the original ore with the production of a molten ferromanganese product and molten residual slag, and separating and recovering the molten ferromanganese product from the molten residual slag, the temperatures within both furnaces being controlled within the range 1300° C.–1500° C. during the course of the process by maintaining the arcing tips of the furnace electrodes between about one-half inch (½") from the upper surfaces of the molten slag baths therein and about three inches (3") below the upper surfaces of said molten slag baths.

10. In a process for producing a ferromanganese product from ore comprising oxides of manganese, iron, calcium and silica, the improvement which comprises passing the ore in the form of a calcined, substantially constant composition charge into a first covered electric furnace and onto the surface of a molten slag bath maintained therein, subjecting the charge to the action of a controlled amount of a dry solid carbonaceous reducing agent within the furnace at a controlled temperature within the range 1300° C.–1500° C. to effect selective reduction to the metallic state of a major portion of the iron of the ore with the production of molten metallic iron and molten slag containing substantially all of the manganese of the original ore, separating the molten metallic iron from the molten slag, passing the molten slag into a second covered electric furnace and onto the surface of a molten slag bath maintained therein, subjecting the slag to the action of a controlled amount of a solid carbonaceous reducing agent in the presence of added silica at a controlled temperature within the range 1300° C.–1500° C. to effect reduction to the metallic state of substantially all of the manganese contained therein, the remainder of the iron of the original ore, and a controlled amount of silica with the production of a molten ferromanganese silicon product of controlled silicon-carbon content and a molten waste slag product, separating and recovering the molten ferromanganese silicon product from the molten waste slag, passing a controlled amount of said ferromanganese silicon in molten form from the second furnace into a third covered electric furnace and onto the surface of a molten slag bath maintained therein together with additional quantities of molten manganese-containing slag from said first furnace, subjecting said manganese-containing slag to a reducing treatment with said ferromanganese silicon at a controlled temperature within the range 1300° C.–1500° C. to effect reduction to the metallic state of substantially all of the manganese and the remainder of the iron oxide of the original ore contained therein with the production of a molten ferromanganese product of controlled carbon content and molten residual slag, and separating and recovering said molten ferromanganese product from said molten residual slag, the temperatures within all three furnaces being controlled within the range 1300° C.–1500° C. during the course of the process by combined arc-resistance and slag-resistance heating obtained by maintaining the arcing tips of the furnace electrodes between about one-half inch (½") from the upper surfaces of the molten slag baths therein and about three inches (3") below the upper surfaces of said molten slag baths.

11. In a process for producing iron and ferromanganese from high manganese iron ores comprising oxides of manganese, iron, calcium, and silica, the improvement which comprises subjecting the ore to a preliminary heat treatment in a rotary kiln under reducing conditions to stabilize the ore to a substantially constant composition and to effect partial reduction to the metallic state of iron of the iron oxide contained therein, passing the hot product of the preliminary heat treatment in the form of a charge into a first covered electric furnace and onto the surface of a molten slag bath maintained therein, subjecting the charge to the action of a controlled amount of a dry solid carbonaceous reducing agent within the furnace at a controlled temperature within the range 1300° C.–1500° C. to effect selective reduction to the metallic state of a major portion of the iron of the ore with the production of molten metallic iron and molten slag containing substantially all of the manganese of the original ore, separating the molten metallic iron from the molten slag, passing the molten slag into a second covered electric furnace and onto the surface of a molten slag bath maintained therein, subjecting the slag to the action of a controlled amount of a solid carbonaceous reducing agent in the presence of added silica at a controlled temperature within the range 1300° C.–1500° C. to effect reduction to the metallic state of substantially all of the manganese contained therein, the remainder of the iron of the original ore, and a controlled amount of silica with the production of a molten ferromanganese silicon product of controlled silicon-carbon content and a molten waste slag product, separating and recovering the molten ferromanganese silicon product from the molten waste slag, passing a controlled amount of said ferromanganese silicon in molten form from the second furnace into a third covered electric furnace and onto the surface of a molten slag bath maintained therein together with additional quantities of molten manganese-containing slag from said first furnace, subjecting said manganese-containing slag to a reducing treatment with said ferromanganese silicon at a controlled temperature within the range 1300° C.–1500° C. to effect reduction to the metallic state of substantially all of the manganese and the remainder of the iron oxide of the original ore contained therein with the production of a molten ferromanganese product of controlled carbon content and molten residual slag, and separating and recovering said molten ferromanganese product from said molten residual slag, the temperatures within all three furnaces being controlled within the range 1300° C.–1500° C. during the course of the process by maintaining the arcing tips of the furnace electrodes between about one-half inch (½") from the upper surfaces of the molten slag baths therein and about three inches (3") below the upper surfaces of said molten slag baths.

12. In a process for producing a ferromanganese product from ore comprising oxides of manganese, iron, calcium and silica, the improvement that comprises passing the ore in the form of a calcined, substantially constant composition charge into a first covered electric arc furnace and onto the surface of a molten slag bath maintained therein, utilizing the manganous oxide naturally present within the ore as a basic fluxing agent to produce a relatively low temperature slag product within said first furnace, subjecting the charge to the action of a controlled amount of a solid carbonaceous reducing agent within the furnace at a controlled temperature within the range 1300° C.–1500° C. to effect selective reduction to the metallic state of a major portion of the iron oxide of the ore with the production of molten metallic iron and molten slag containing substantially all of the manganese of the original ore in the form of manganese silicate, separating the molten metallic iron from the molten slag, passing the molten slag recovered from the first furnace into a second covered electric arc furnace and onto the surface of a molten slag bath maintained therein, subjecting the slag to the action of a controlled amount of a solid carbonaceous reducing agent at a controlled temperature also within the range 1300–1500° C. to effect reduction to the metallic state of substantially all of the manganese contained therein and the remainder of the iron oxide of the original ore with the production of a molten ferromanganese product and molten residual slag, and separating and recovering the molten ferromanganese product from the molten residual slag, the temperature within both furnaces being controlled within said range 1300–1500° C. during the course of the process by maintaining the arcing tips of the furnace electrodes between about one-half inch (½") from the upper surfaces of the respective molten slag baths therein and about three inches (3") below the upper surfaces of said molten slag baths, thereby to effect continuous combined arc-resistance and slag-resistance heating.

References Cited in the file of this patent

UNITED STATES PATENTS

| 1,349,322 | Clevenger et al. | Aug. 10, 1920 |
| 1,484,670 | Petinot | Feb. 26, 1924 |
| 1,751,083 | Gustafsson | Mar. 18, 1930 |
| 1,857,779 | Flodin et al. | May 10, 1932 |
| 2,098,176 | Udy | Nov. 2, 1937 |
| 2,310,258 | Riverol | Feb. 9, 1943 |
| 2,523,092 | Bryk et al. | Sept. 19, 1950 |
| 2,549,994 | Udy | Apr. 24, 1951 |

FOREIGN PATENTS

| 18,945 | Great Britain | 1910 |
| 8,400 | Great Britain | 1912 |